United States Patent
Dominique et al.

(10) Patent No.: US 8,965,440 B2
(45) Date of Patent: Feb. 24, 2015

(54) METHOD OF ESTIMATING A CURRENT CHANNEL CONDITION IN A WIRELESS COMMUNICATIONS NETWORK

(75) Inventors: Francis Dominique, Rockaway, NJ (US); Hongwel Kong, Denville, NJ (US); Walid E. Nabhane, Bedminster, NJ (US)

(73) Assignee: Alcatel Lucent, Boulogne-Billancourt (FR)

( * ) Notice: Subject to any disclaimer, the term of this patent is extended or adjusted under 35 U.S.C. 154(b) by 1916 days.

(21) Appl. No.: 11/139,693

(22) Filed: May 31, 2005

(65) Prior Publication Data
US 2006/0270432 A1 Nov. 30, 2006

(51) Int. Cl.
*H04B 1/00* (2006.01)
*H04L 1/16* (2006.01)
*H04W 52/58* (2009.01)
*H04L 1/00* (2006.01)
*H04L 1/18* (2006.01)

(52) U.S. Cl.
CPC ............ *H04L 1/1671* (2013.01); *H04W 52/58* (2013.01); *H04L 1/0001* (2013.01); *H04L 1/1812* (2013.01)
USPC ............................................ 455/522; 455/69

(58) Field of Classification Search
CPC .............................. H04W 52/24; H04W 52/50
USPC ........................................................ 455/522
See application file for complete search history.

(56) References Cited

U.S. PATENT DOCUMENTS

| | | | |
|---|---|---|---|
| 5,842,113 A * | 11/1998 | Nanda et al. | 455/69 |
| 5,982,760 A * | 11/1999 | Chen | 370/335 |
| 6,058,107 A * | 5/2000 | Love et al. | 370/332 |
| 6,259,927 B1 * | 7/2001 | Butovitsch et al. | 455/522 |
| 6,584,086 B1 * | 6/2003 | Shim et al. | 370/335 |
| 6,597,894 B1 * | 7/2003 | Ue et al. | 455/69 |
| 6,618,375 B2 * | 9/2003 | Rezaiifar et al. | 370/394 |
| 6,654,613 B1 * | 11/2003 | Maeng et al. | 455/522 |
| 6,658,050 B1 | 12/2003 | Ramesh et al. | 375/219 |
| 6,754,506 B2 * | 6/2004 | Chang et al. | 455/522 |
| 6,760,567 B1 * | 7/2004 | Jeong et al. | 455/67.11 |
| 6,778,511 B1 * | 8/2004 | Magnus et al. | 370/328 |
| 6,807,164 B1 * | 10/2004 | Almgren et al. | 370/342 |
| 6,823,193 B1 * | 11/2004 | Persson et al. | 455/522 |
| 6,912,228 B1 * | 6/2005 | Dahlman et al. | 370/441 |
| 6,952,591 B2 * | 10/2005 | Budka et al. | 455/517 |
| 6,970,438 B2 * | 11/2005 | Mate et al. | 370/329 |
| 7,013,143 B2 * | 3/2006 | Love et al. | 455/450 |
| 7,043,244 B1 * | 5/2006 | Fauconnier | 455/442 |
| 7,054,633 B2 * | 5/2006 | Seo et al. | 455/439 |

(Continued)

FOREIGN PATENT DOCUMENTS

| | | |
|---|---|---|
| JP | 2002-152228 | 5/2002 |
| JP | 2003-143654 | 5/2003 |
| JP | 2004-215104 | 7/2004 |

OTHER PUBLICATIONS

Toskala et al., "High-speed Downlink Packet Access", 2002, John Wiley & Sons, Ltd., pp. 279-304.*

(Continued)

*Primary Examiner* — Hai V Nguyen
(74) *Attorney, Agent, or Firm* — Harness, Dickey & Pierce

(57) ABSTRACT

In the method, a current channel condition is estimated based at least in part on a previous channel quality indicator and power control information received after the previous channel quality indicator.

14 Claims, 5 Drawing Sheets

(56) References Cited

U.S. PATENT DOCUMENTS

| | | | | |
|---|---|---|---|---|
| 7,075,969 | B2* | 7/2006 | Zeira et al. | 375/130 |
| 7,079,859 | B2* | 7/2006 | Nobukiyo et al. | 455/522 |
| 7,085,254 | B1* | 8/2006 | Yun et al. | 370/342 |
| 7,116,944 | B2* | 10/2006 | Das et al. | 455/69 |
| 7,200,127 | B1* | 4/2007 | Lee et al. | 370/335 |
| 7,206,596 | B2* | 4/2007 | Nishio | 455/522 |
| 7,209,712 | B2* | 4/2007 | Holtzman | 455/67.13 |
| 7,236,474 | B2* | 6/2007 | Seo et al. | 370/329 |
| 7,245,598 | B2* | 7/2007 | Puig-Oses et al. | 370/334 |
| 7,280,837 | B2* | 10/2007 | Guan et al. | 455/452.2 |
| 7,292,552 | B2* | 11/2007 | Willenegger et al. | 370/333 |
| 7,310,499 | B2* | 12/2007 | Magnusson et al. | 455/69 |
| 7,313,409 | B2* | 12/2007 | Iacono et al. | 455/522 |
| 7,317,702 | B2* | 1/2008 | Dominique et al. | 370/328 |
| 7,321,780 | B2* | 1/2008 | Love et al. | 455/522 |
| 7,324,828 | B2* | 1/2008 | Nagaoka et al. | 455/522 |
| 7,333,457 | B2* | 2/2008 | Gopalakrishnan et al. | 370/335 |
| 7,333,546 | B2* | 2/2008 | Kim et al. | 375/242 |
| 7,340,268 | B2* | 3/2008 | Oh et al. | 455/522 |
| 7,346,034 | B2* | 3/2008 | Takano et al. | 370/331 |
| 7,352,722 | B2* | 4/2008 | Malladi et al. | 370/335 |
| 7,356,022 | B2* | 4/2008 | Takano et al. | 370/350 |
| 7,366,230 | B2* | 4/2008 | Jonsson | 375/219 |
| 7,372,836 | B2* | 5/2008 | Hwang et al. | 370/335 |
| 7,386,321 | B2* | 6/2008 | Miyoshi et al. | 455/522 |
| 7,403,745 | B2* | 7/2008 | Dominique et al. | 455/67.11 |
| 7,403,791 | B2* | 7/2008 | Oki et al. | 455/522 |
| 7,406,065 | B2* | 7/2008 | Willenegger et al. | 370/335 |
| 7,406,070 | B2* | 7/2008 | Nilsson | 370/342 |
| 7,436,794 | B2* | 10/2008 | Takahashi et al. | 370/318 |
| 7,444,169 | B2* | 10/2008 | Ishii et al. | 455/561 |
| 7,606,591 | B2* | 10/2009 | Itoh et al. | 455/522 |
| 7,630,692 | B2* | 12/2009 | Itoh et al. | 455/69 |
| 7,724,813 | B2* | 5/2010 | Wang et al. | 375/227 |
| 7,769,038 | B2* | 8/2010 | Hamilton et al. | 370/429 |
| 7,916,681 | B2* | 3/2011 | Andersson et al. | 370/318 |
| 7,983,620 | B2* | 7/2011 | Itoh et al. | 455/67.11 |
| 8,060,127 | B2* | 11/2011 | Anderson | 455/522 |
| 8,249,044 | B2* | 8/2012 | Onodera et al. | 370/343 |
| 8,351,975 | B2* | 1/2013 | Anderson | 455/522 |
| 8,521,212 | B2* | 8/2013 | Anderson | 455/522 |
| 8,688,049 | B2* | 4/2014 | Simonsson et al. | 455/67.11 |
| 8,712,464 | B2* | 4/2014 | Andersson et al. | 455/522 |
| 2002/0123351 | A1 | 9/2002 | Miyoshi et al. | 455/452 |
| 2002/0141331 | A1* | 10/2002 | Mate et al. | 370/218 |
| 2002/0160801 | A1 | 10/2002 | Uesugi | 455/522 |
| 2003/0086385 | A1* | 5/2003 | Kwon et al. | 370/320 |
| 2003/0095532 | A1* | 5/2003 | Kim et al. | 370/342 |
| 2003/0100267 | A1* | 5/2003 | Itoh et al. | 455/69 |
| 2003/0109274 | A1* | 6/2003 | Budka et al. | 455/522 |
| 2003/0119452 | A1* | 6/2003 | Kim et al. | 455/69 |
| 2003/0123396 | A1* | 7/2003 | Seo et al. | 370/252 |
| 2003/0148738 | A1* | 8/2003 | Das et al. | 455/67.5 |
| 2003/0148770 | A1* | 8/2003 | Das et al. | 455/455 |
| 2003/0210668 | A1* | 11/2003 | Malladi et al. | 370/335 |
| 2003/0232622 | A1* | 12/2003 | Seo et al. | 455/437 |
| 2004/0057394 | A1* | 3/2004 | Holtzman | 370/317 |
| 2004/0125766 | A1* | 7/2004 | Takano et al. | 370/328 |
| 2004/0142698 | A1* | 7/2004 | Pietraski | 455/452.2 |
| 2004/0171387 | A1* | 9/2004 | Miyoshi et al. | 455/452.2 |
| 2005/0043051 | A1* | 2/2005 | Takano et al. | 455/522 |
| 2005/0047387 | A1* | 3/2005 | Frederiksen et al. | 370/349 |
| 2005/0047393 | A1* | 3/2005 | Liu | 370/352 |
| 2005/0048920 | A1* | 3/2005 | Liu | 455/63.1 |
| 2005/0068921 | A1* | 3/2005 | Liu | 370/335 |
| 2005/0068990 | A1* | 3/2005 | Liu | 370/516 |
| 2005/0083869 | A1* | 4/2005 | Takahashi et al. | 370/318 |
| 2005/0085255 | A1* | 4/2005 | Andersson et al. | 455/522 |
| 2005/0111391 | A1* | 5/2005 | Oki et al. | 370/311 |
| 2005/0143112 | A1* | 6/2005 | Jonsson | 455/522 |
| 2005/0180450 | A1* | 8/2005 | Gaal et al. | 370/437 |
| 2005/0197149 | A1* | 9/2005 | Iacono et al. | 455/522 |
| 2005/0201499 | A1* | 9/2005 | Jonsson | 375/348 |
| 2005/0208961 | A1* | 9/2005 | Willenegger | 455/522 |
| 2005/0220052 | A1* | 10/2005 | Uehara et al. | 370/331 |
| 2005/0239467 | A1* | 10/2005 | Nishio | 455/442 |
| 2005/0250510 | A1* | 11/2005 | Kaikkonen et al. | 455/452.2 |
| 2005/0277419 | A1* | 12/2005 | Takano et al. | 455/442 |
| 2006/0007889 | A1* | 1/2006 | Khan | 370/331 |
| 2006/0014542 | A1* | 1/2006 | Khandekar et al. | 455/447 |
| 2006/0046738 | A1* | 3/2006 | Guan et al. | 455/452.2 |
| 2006/0068825 | A1* | 3/2006 | Iochi | 455/522 |
| 2006/0072567 | A1* | 4/2006 | Casaccia et al. | 370/389 |
| 2006/0092869 | A1* | 5/2006 | Herrmann | 370/314 |
| 2006/0099985 | A1* | 5/2006 | Whinnett et al. | 455/522 |
| 2006/0105719 | A1* | 5/2006 | Itoh et al. | 455/69 |
| 2006/0116118 | A1* | 6/2006 | Charriere et al. | 455/423 |
| 2006/0121856 | A1* | 6/2006 | Itoh et al. | 455/69 |
| 2006/0135080 | A1* | 6/2006 | Khandekar et al. | 455/69 |
| 2006/0142040 | A1* | 6/2006 | Jones | 455/522 |
| 2006/0205358 | A1* | 9/2006 | Itoh et al. | 455/69 |
| 2006/0209970 | A1* | 9/2006 | Kanterakis | 375/259 |
| 2006/0217088 | A1* | 9/2006 | Nagaoka et al. | 455/127.1 |
| 2006/0233222 | A1* | 10/2006 | Reial et al. | 375/147 |
| 2006/0240859 | A1* | 10/2006 | Gervais et al. | 455/522 |
| 2006/0246937 | A1* | 11/2006 | Lindoff | 455/522 |
| 2006/0262754 | A1* | 11/2006 | Andersson et al. | 370/332 |
| 2006/0262840 | A1* | 11/2006 | Wang et al. | 375/221 |
| 2006/0270432 | A1* | 11/2006 | Dominique et al. | 455/522 |
| 2006/0274679 | A1* | 12/2006 | Khandekar et al. | 370/278 |
| 2007/0032196 | A1* | 2/2007 | Dominique et al. | 455/67.11 |
| 2007/0076641 | A1* | 4/2007 | Bachl et al. | 370/310 |
| 2007/0133479 | A1* | 6/2007 | Montojo et al. | 370/335 |
| 2007/0149201 | A1* | 6/2007 | Dominique et al. | 455/442 |
| 2007/0189199 | A1* | 8/2007 | Nishio | 370/328 |
| 2007/0230324 | A1* | 10/2007 | Li et al. | 370/204 |
| 2007/0281728 | A1* | 12/2007 | Charriere et al. | 455/522 |
| 2007/0287487 | A1* | 12/2007 | Puig-Oses et al. | 455/501 |
| 2008/0004033 | A1* | 1/2008 | Tiedemann et al. | 455/453 |
| 2008/0037450 | A1* | 2/2008 | Itoh et al. | 370/278 |
| 2008/0039145 | A1* | 2/2008 | Ishii et al. | 455/561 |
| 2008/0123601 | A1* | 5/2008 | Malladi et al. | 370/335 |
| 2008/0200201 | A1* | 8/2008 | Jonsson | 455/522 |
| 2009/0011771 | A1* | 1/2009 | Takahashi et al. | 455/452.2 |
| 2009/0124211 | A1* | 5/2009 | Itoh et al. | 455/69 |
| 2011/0111790 | A1* | 5/2011 | Andersson et al. | 455/522 |

OTHER PUBLICATIONS

Kolding et al. "Performance Aspects of WCDMA Systems with High Speed Downlink Packet Access (HSDPA)", 2002 IEEE, pp. 477-481.*

3GPP TS 25.214, 3rd Generation Partnership Project: Technical Specification Group Radio Access Network; Physical layer procedures (FDD), 3GPP, release 5, 56 pages.*

PCT International Search Report dated Sep. 14, 2006.

Korean Preliminary Rejection for corresponding patent application No. 10-2007-7027919 mailed May 25, 2012 with English translation.

Office Action for corresponding Japanese patent application No. 2008-514662 mailed Oct. 3, 2011 with English translation.

Office Action for corresponding Chinese patent application No. 200680019030.0 mailed Mar. 6, 2012 with English translation.

Board Opinion issued by the Patent Reexamination Board dated Apr. 29, 2014, issued in Chinese Patent Application No. 200680019030.0, with English translation.

Board Opinion issued by the Patent Reeaxarnination Board dated Sep. 28, 2014, issued in Chinese Patent Application No. 200680019030.0, with English translation.

* cited by examiner

RELATED ART

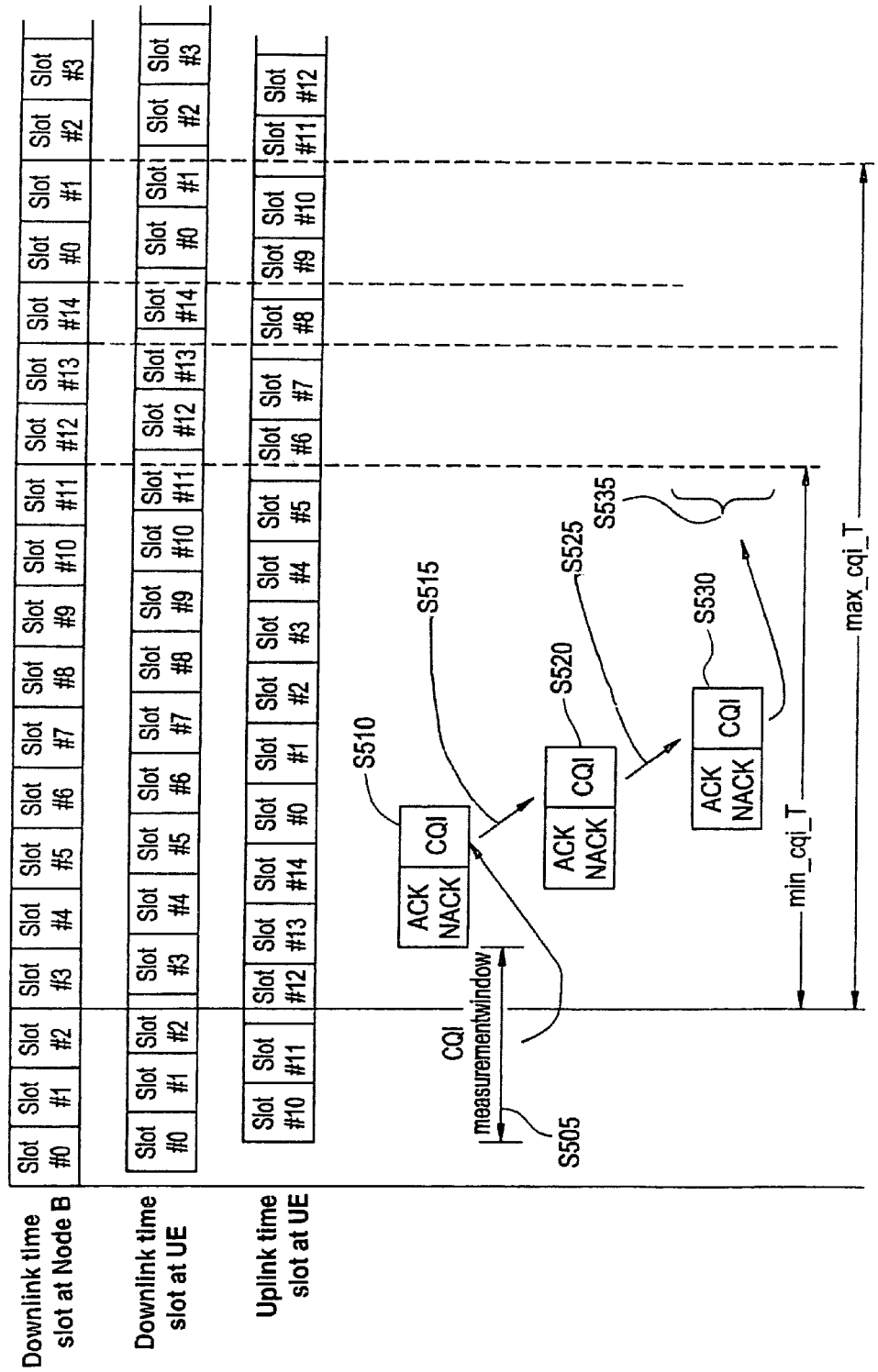

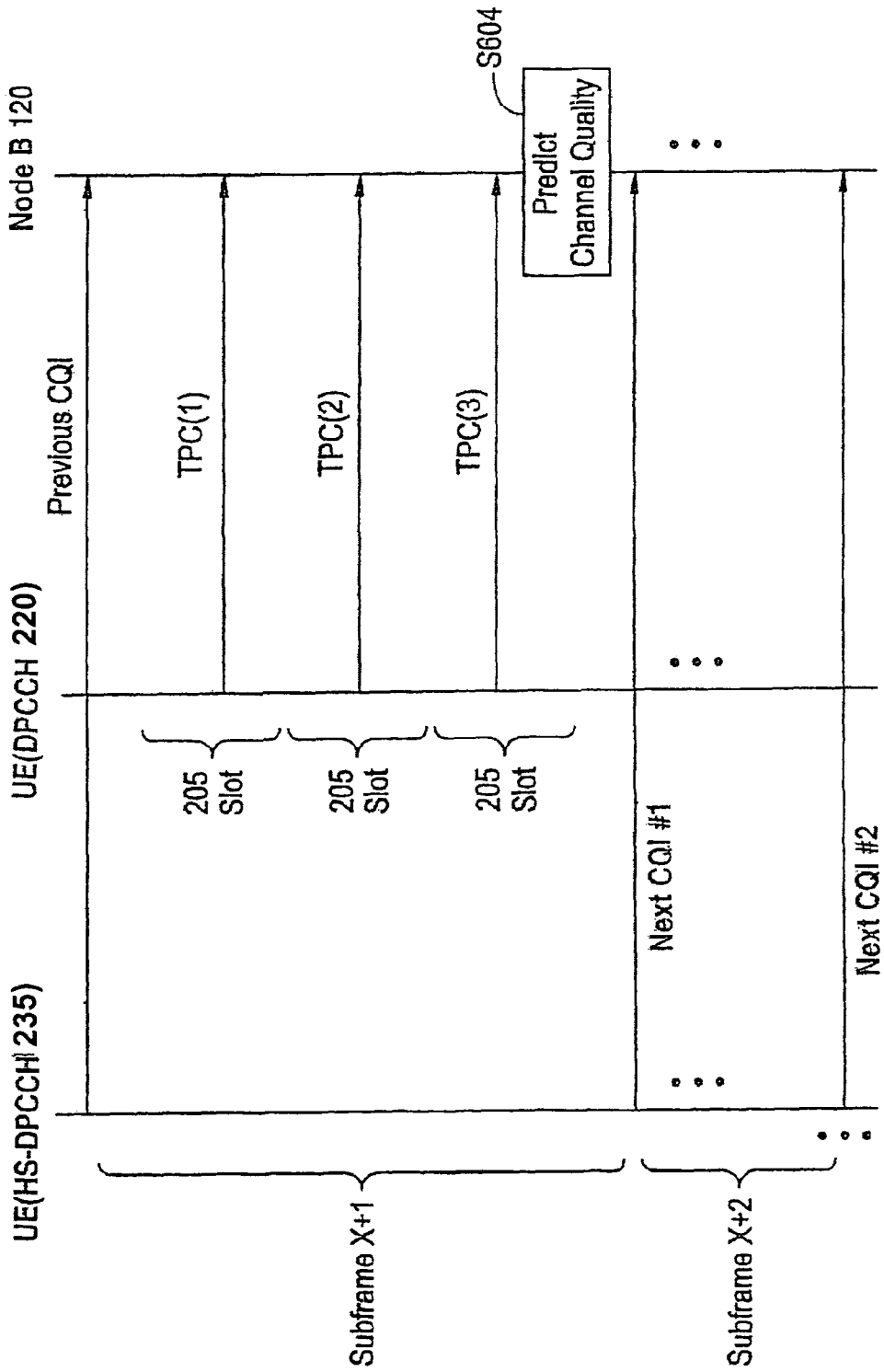

US 8,965,440 B2

METHOD OF ESTIMATING A CURRENT CHANNEL CONDITION IN A WIRELESS COMMUNICATIONS NETWORK

BACKGROUND OF THE INVENTION

1. Field of the Invention

The present invention relates generally to a wireless communications network, and more particularly, to a method of estimating a current channel condition in a wireless communications network.

2. Description of the Related Art

A cellular communications network typically includes a variety of communication nodes coupled by wireless or wired connections and accessed through different types of communications channels. Each of the communication nodes includes a protocol stack that processes the data transmitted and received over the communications channels. Depending on the type of communications system, the operation and configuration of the various communication nodes can differ and are often referred to by different names. Such communications systems include, for example, a Code Division Multiple Access 2000 (CDMA2000) system and Universal Mobile Telecommunications System (UMTS).

UMTS is a wireless data communication and telephony standard which describes a set of protocol standards. UMTS sets forth the protocol standards for the transmission of voice and data between a base station (BS) or Node B and a mobile or User Equipment (UE). UMTS systems typically include multiple radio network controllers (RNCs). The RNC in UMTS networks provides functions equivalent to the Base Station Controller (BSC) functions in GSM/GPRS networks. However, RNCs may have further capabilities including, for example, autonomously managing handovers without involving mobile switching centers (MSCs) and Serving General Packet Radio Service (GPRS) Support Nodes (SGSNs). The Node B is responsible for air interface processing and some Radio Resource Management functions. The Node B in UMTS networks provides functions equivalent to the Base Transceiver Station (BTS) in GSM/GPRS networks. Node Bs are typically physically co-located with existing GSM base transceiver station (BTS) to reduce the cost of UMTS implementation and minimize planning consent restrictions.

FIG. 1 illustrates a conventional communication system 100 operating in accordance with UMTS protocols. Referring to FIG. 1, the communication system 100 may include a number of Node Bs such as Node Bs 120, 122 and 124, each serving the communication needs of UEs such as UEs 105 and 110 in their respective coverage area. The Node Bs are connected to an RNC such as RNCs 130 and 132, and the RNCs are connected to a MSC/SGSN 140. The RNC handles certain call and data handling functions, such as, as discussed above, autonomously managing handovers without involving MSCs and SGSNs. The MSC/SGSN 140 handles routing calls and/or data to other elements (e.g., RNCs 130/132 and Node Bs 120/122/124) in the network or to an external network. Further illustrated in FIG. 1 are conventional interfaces Uu, Iub, Iur and Iu between these elements.

Third generation wireless communication protocol standards (e.g., 3GPP-UMTS, 3GPP2-CDMA, etc.) may employ a dedicated traffic channel in the uplink (e.g., a communication flow between a mobile station (MS) or UE and a base station (BS) or Node B). The dedicated traffic channel may include a data part (e.g., a dedicated physical data channel (DPDCH) in accordance with UMTS protocols, a fundamental channel or supplemental channel in accordance with CDMA2000 protocols, etc.) and a control part (e.g., a dedicated physical control channel (DPCCH) in accordance with UMTS protocols, a pilot/power control sub-channel in accordance with CDMA2000 protocols, etc.).

High Speed Downlink Packet Access (HSDPA) is introduced in Release 5 of the third generation wireless standards for 3GPP-UMTS. To achieve high-speed data transmissions, two new channels in the downlink are introduced; namely, a high speed shared control channel (HS-SCCH) and a high speed downlink shared channel (HS-DSCH). The HS-SCCH carries the control information for the HS-DSCH (the actual packet data). The HS-DSCH is transmitted using a high speed physical downlink shared channel (HS-PDSCH). The HS-SCCH and HS-PDSCH for one cell (e.g., one of Node Bs 120, 122, 124, etc.) are shared by all HSDPA users (e.g., UE 105, UE 110, etc.) in that cell. A Node B scheduler (e.g., for one of Node B 120, Node B 122, Node B 124, etc.) decides which UE (e.g., UE 105/110) to transmit to, a given amount of data to transmit, a given power level for the transmission and a given modulation/coding format for the transmission based on a number of factors, such as an instantaneous downlink quality, quality of services (QoS) requirements, etc. After the Node B scheduler determines the parameters for the transmission, the transmission is scheduled. The data format as well as user identification information is carried in the HS-SCCH that accompanies the HS-PDSCH.

Knowledge of real-time downlink channel quality at the Node B scheduler may affect the efficiency of a HSDPA system. In the current UMTS-HSDPA standards, the downlink channel quality is determined by measuring the channel quality at the UE (e.g., UE 105, UE 110, etc.) and having the UE report the measured channel quality to the Node B (e.g., Node B 120, Node B 122, Node B 124, etc.) through a code channel in the uplink. The uplink code channel is a newly introduced high speed dedicated physical control channel (HS-DPCCH). The HS-DPCCH is introduced in Release 5 of the third generation wireless standards for 3GPP-UMTS to support HSDPA operations and may carry acknowledgment (ACK) and negative ACK (NACK) signals as well as a channel quality indicator (CQI) signal. The measured channel quality may be quantized (e.g., to a 5 bit binary number) at the UE to generate the CQI signal. At the Node B, the CQI signal may be converted into a channel quality metric, for example a common pilot channel (CPICH) carrier-to-noise ratio (Ec/Nt).

For stationary or very low mobility (e.g., slow moving) UEs, the Node B scheduler may use the CPICH Ec/Nt as a measure of the UE's current channel quality because the UE is moving slowly and the CPICH Ec/Nt may approximate the UE's current channel quality. However, as mobility or speed of the UE increases, the CPICH Ec/Nt may be less likely to function as an accurate indicator of the UE's current channel quality. For example, some wireless communication systems have a latency of 9 milliseconds (ms), which means the Node B scheduler is using a value for the CPICH Ec/Nt that is approximately 9 ms older than a current CPICH Ec/Nt. In this example, the conventional measure of the CPICH Ec/Nt may work well for UEs at a velocity less than 10 kilometers per hour (Kmph), but not necessarily for higher velocity UEs.

SUMMARY OF THE INVENTION

An example embodiment of the present invention is directed to a method of estimating a current channel condition. The estimating may be based at least in part on a previous channel quality indicator and power control information received after the previous channel quality indicator. In an example, the power control information may include at least one transmit power control (TPC) command.

BRIEF DESCRIPTION OF THE DRAWINGS

The present invention will become more fully understood from the detailed description given herein below and the accompanying drawings which are given by way of illustration only, wherein like reference numerals designate corresponding parts in the various drawings, and wherein:

FIG. 5 illustrates a communication diagram of conventional channel quality indicator (CQI) reporting.

FIG. 6 illustrates a communication flow diagram for predicting a current channel quality according to an example embodiment of the present invention.

DETAILED DESCRIPTION OF EXAMPLE EMBODIMENTS OF THE PRESENT INVENTION

In order to better understand the present invention, an example of a conventional uplink frame structure for a UMTS wireless communication system and an example communication flow diagram of a conventional downlink channel quality reporting will be described, followed by descriptions of downlink channel quality prediction according to example embodiments of the present invention.

Conventional UMTS Uplink Frame Structure

Figure 1:
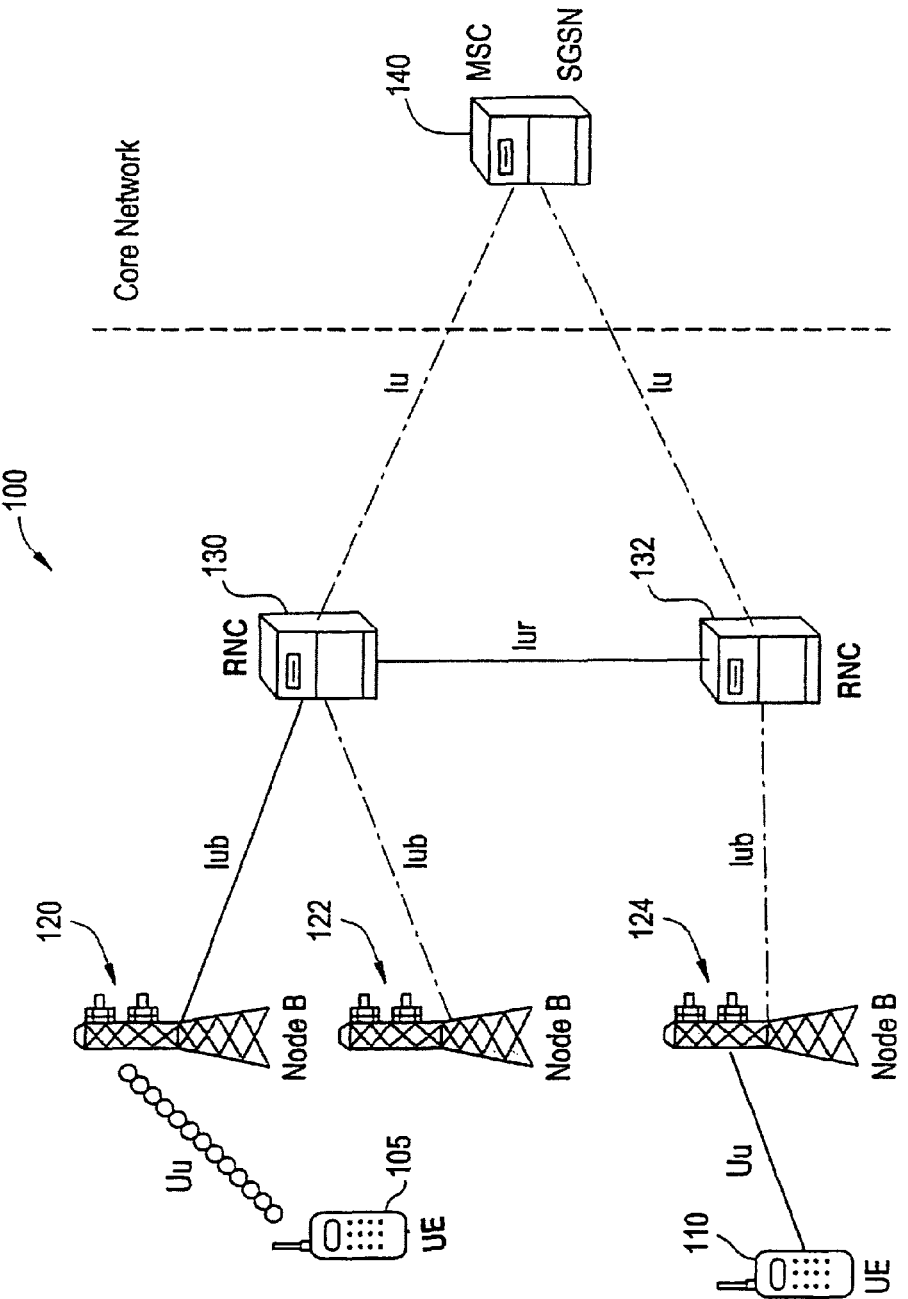
FIG. 1 illustrates a conventional communication system operating in accordance with Universal Mobile Telecommunications System (UMTS) protocols.
Figure 2:
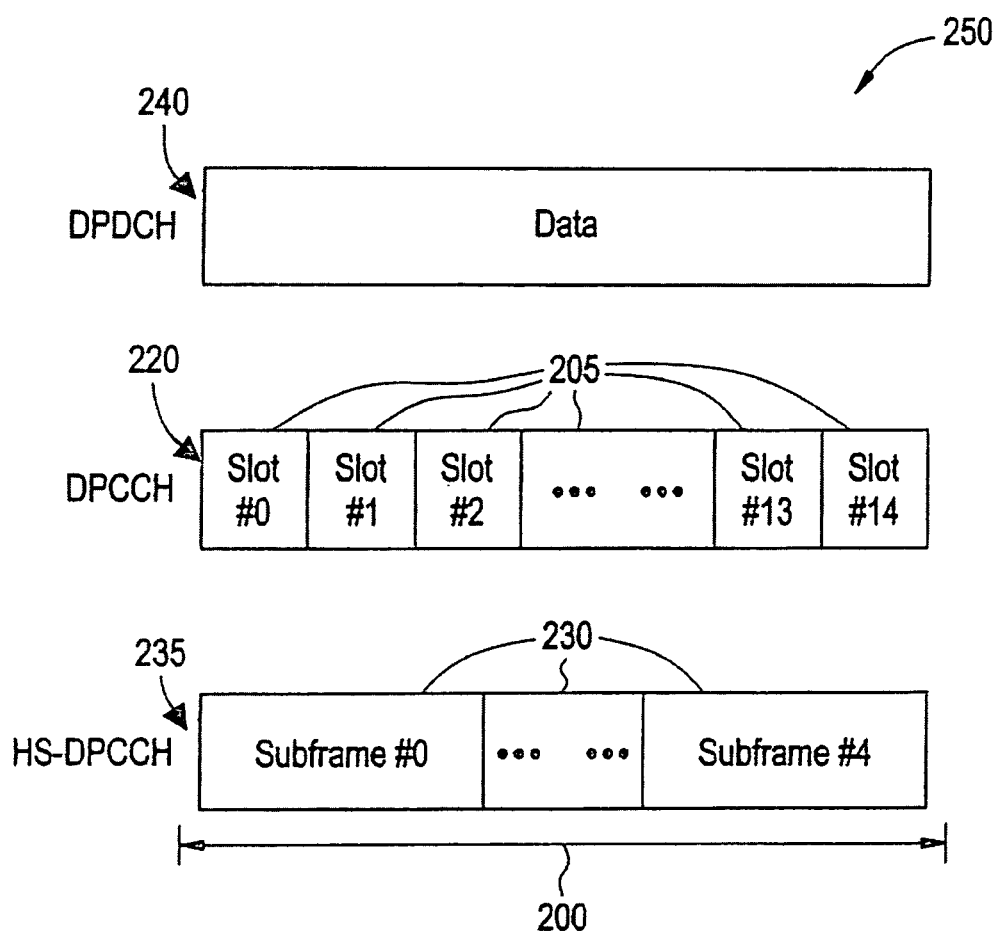
FIG. 2 illustrates an example of a frame of a UMTS uplink dedicated traffic channel including a high speed dedicated physical control channel (HS-DPCCH).

FIG. 2 illustrates an example of a frame 200 of a UMTS uplink dedicated traffic channel 250 including a DPDCH 240, a DPCCH 220 and a high speed dedicated physical control channel (HS-DPCCH) 235. Each frame 200 may have a length of, for example, 10 milliseconds (ms) and, for the DPCCH 220, may be partitioned into a plurality of slots 205 (e.g., 15 slots). Each slot 205 may have a length of, for example, 2560 chips, which may correspond to one power-control period, and may have a duration of, for example ⅔ ms. The DPCCH 220 will be described in further detail below with respect to FIG. 3.

Each of the DPCCH 220 and the DPDCH 240 may be code multiplexed. The DPDCH 240 may include information transmitted from a mobile station or user equipment (UE). The HS-DPCCH 225 may include a plurality of subframes 230 within the frame 200. Each subframe 230 in the HS-DPCCH may correspond to a plurality of slots 205 in the DPCCH.

Figure 3:
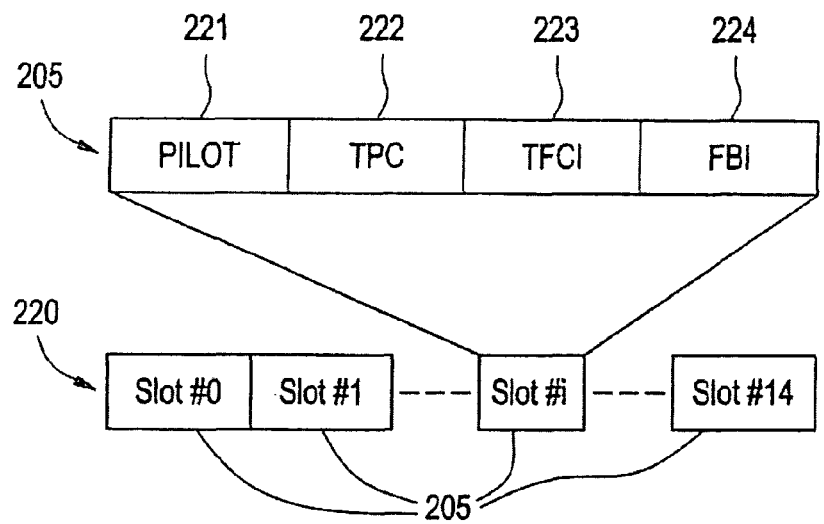
FIG. 3 illustrates an example slot structure for a given slot of a DPCCH.

FIG. 3 illustrates an example slot structure for a given slot 205 of the DPCCH 220. Each slot 205 in the frame 200 of the DPCCH 220 may include control information, for example, a pilot signal 221, a transmit power control (TPC) command 222, transport format combination indicator (TFCI) bits 223 and feedback information (FBI) 224.

In an example, each slot 205 may include a total of 10 bits, with a given number of pilot bits (e.g., pilot signal 221) and control bits (e.g., a combination of TPC bits in the TPC command 222, TFCI bits 223 and FBI bits 224). In a further example, each slot 205 may include 10 bits with 5 pilot bits, 2 TFCI bits, 1 FBI bit and 2 TPC bits. However, the number of total bits for each slot 205 as well as the bit composition of each slot 205 (e.g., other numbers of TFCI bits, FBI bits, pilot bits, TPC bits, etc.) may vary and may be controlled by a RNC (e.g., RNC 130, RNC 132, etc.).

The TFCI 223 may inform a Node B of the transport format of information (e.g., voice and/or data packets, frames, etc.) transmitted from a UE.

Each of the UE and the Node B may generate and transmit TPC bits in the TPC command 222 of the uplink DPCCH 220 and the downlink DPCCH (not shown), respectively, to control each others transmit power. When the UE communicates with, for example, a single Node B (e.g., when the UE is not in soft handoff), a single TPC command 222 may be received in each timeslot.

In an example, each slot 205 in the frame 200 may include a TPC command 222 with either 1 or 2 TPC bits. If a given slot 205 includes 2 TPC bits, the values for each of the 2 TPC bits may be identical; namely, the TPC bits in the TPC command 222 are either both "0" or both "1", given as "00" and "11", respectively. The TPC bits in the TPC command 222 may be used to adjust the downlink transmit power in order to converge the downlink transmit power to a desired target power. For example, if the TPC bits in the TPC command 222 are "0" or "00", the downlink transmit power may be decreased. In another example, if the TPC bits in the TPC command 222 are "1" or "11", the downlink transmit power may be increased.

While FIGS. 2 and 3 illustrate a 3GPP-UMTS uplink frame structure, a 3GPP2-UMTS uplink frame structure may be similar. However, a typical 3GPP2-UMTS uplink frame structure does not include the above-described TFCI 223 and FBI 224.

Figure 4:
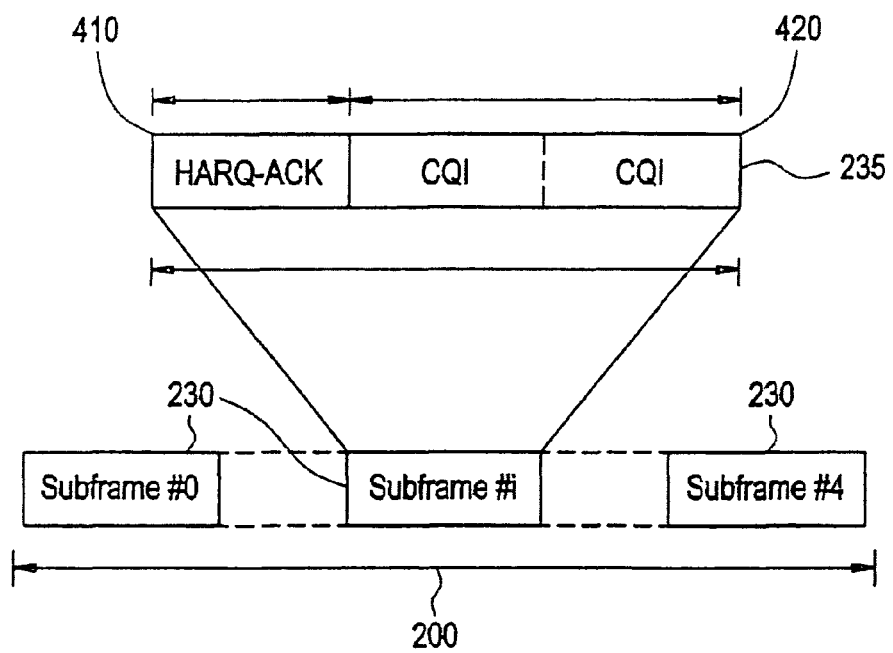
FIG. 4 illustrates a given subframe of a HS-DPCCH.

FIG. 4 illustrates a given subframe 230 of the HS-DPCCH 235. In the example where each frame 200 has a duration of 10 ms, each subframe 230 of the HS-DPCCH 235 may have a duration of 2 ms, which may be equivalent to 3 slots 205 for the DPCCH 220, where each slot 205 has a duration of ⅔ ms. Each subframe 230 may include a hybrid automatic request (HARQ)-acknowledgment (ACK) 410 and a channel quality indicator (CQI) 420. In an example, the HARQ-ACK 410 may be allotted 2560 chips (e.g., corresponding to a first slot 205 of the subframe 230) and the CQI 420 may be allotted 5120 chips (e.g., corresponding to second and third slots 205 of the subframe 230).

The CQI 420 may be reported once for each subframe 230, for example at an end of a given subframe 230 for which the CQI 420 is being reported. Thus, a highest rate that a UE may transmit the CQI 420 to a Node B may be once for every 3 slots 205 (e.g., 2 ms). However, to conserve UE battery power, 3GPP-UMTS standards allow the CQI 420 to be transmitted at a lower rate, for example every 80 subframes 230 or 240 slots 205.

Conventional Downlink Channel Quality Reporting

FIG. 5 illustrates a communication diagram of conventional CQI 420 reporting.

Channel quality at a given UE (e.g., UE 105, 110, etc.) is measured (at S505) in a CQI measurement window. After the channel quality is measured (at S505), the given UE converts the measured channel quality into the CQI 420 and transmits (at S510) the CQI 420 for representing the measured channel quality to a Node B (e.g., Node B 120, 122, 124, etc.). The CQI 420 experiences propagation delay (at S515) during transmission from the UE to the Node B and arrives at the Node B at a later time than it was initially transmitted by the given UE. The Node B receives the CQI 420 (at S520) and transfers the CQI 420 to the Node B scheduler, where the CQI 420 experiences a processing delay (at S525) during the transfer. The Node B scheduler receives the CQI 420 (at S530) and schedules an adjustment to downlink power (e.g., HS-SCCH power and/or selects an MCS for the HS-PDSCH) for transmissions from the Node B to the given UE based on the received CQI 420. The scheduled adjustment to the downlink power may take effect at a next downlink transmission (at S535). A given number of subframes may lapse between the measurement of the channel quality (at step S505) and the scheduled adjustment to the downlink power (at S535), where the given number of subframes numbers at least min_CQI_T and no more than max_CQI_T. In an example, the min_CQI_T may be approximately 9 ms, which may correlate to 4.5 subframes or 13.5 slots. Various factors such as the propagation/processing delays of steps S515 and S525 may affect the min_CQI_T.

The above-described delays in the reporting of the CQI 420 may cause the downlink power to be adjusted based on older and/or inaccurate information at the Node B scheduler, for example in a situation where the channel quality at the UE changes rapidly (e.g., if the UE is moving at a high speed).

Downlink Channel Quality Prediction with TPC Adjustment

An example embodiment of the present invention will now be described where a current channel quality is predicted based on a previous CQI 420 received at the Node B scheduler with a further consideration of TPC commands 222 received at the Node B scheduler after the previous CQI 420. As discussed above, the conventional art uses only the previous CQI 420 as the current channel quality.

As shown in FIG. 3 and discussed above, the TPC commands 222 may include TPC bits with either 1 or 2 bits in each slot 205 of the DPCCH 220. Further, if 2 bits are allotted to the TPC command 222, each of the one or two bits may be either a "0" or a "1". Thus, for each slot 205 received at the Node B from the given UE in the DPCCH 220, the TPC command 222 may include TPC bits with one of "0", "00", "1" and "11". The Node B may adjust the power of the downlink DPCCH (not shown) and/or the DPDCH (not shown) by a given step size based on the TPC command 222. For example, if the TPC bits in the TPC command 222 are "0" or "00", the downlink transmit power may be decreased by a given amount or step size. In another example, if the TPC bits in the TPC command 222 are "1" or "11", the downlink transmit power may be increased by the given amount or step size. For example, the given step size may be one of 0.5 decibels (dB), 1.0 db, 1.5 dB, 2.0 dB, etc. The RNC (e.g., RNC 130, 132, etc.) may select the given step size corresponding to the TPC command 222 for each Node B.

FIG. 6 illustrates a communication flow diagram for predicting a current channel quality according to an example embodiment of the present invention. While FIG. 6 describes communication between the UE 105 and the Node B 120, it is understood that the example described with respect to FIG. 6 is applicable to communication between any Node B or BS and UE or mobile.

In a previous subframe X (not shown) prior to a subframe (X+1), the UE 105 sends a previous CQI 420 to the Node B 120 on the HS-DPCCH 235. At a first slot 205 at the start of the subframe (X+1), the UE 105 sends a first TPC command TPC(1) to the Node B 120 on the DPCCH 220. At a second slot 205 of the subframe (X+1), the UE 105 sends a second TPC command TPC(2) to the Node B 120. At a third slot 205 of the subframe (X+1), the UE 105 sends a third TPC command TPC(3) to the Node B 120. In step S604, the Node B estimates a current channel quality using the previous CQI 420 and the later received TPC commands TPC(1), TPC(2) and TPC(3), as will be described in further detail later with reference to Equation 1.

The above-described process may continue for any number of slots or subframes, with a latest received CQI replacing the previous CQI 420 with regard to the estimating of the current channel quality. The Node B scheduler may schedule an adjustment to the downlink power based on the estimated current channel quality.

An example method of generating a current channel quality estimate (CCQE) or current CPICH_Ec/Nt, based on a previous CQI 420 and later received TPC commands (e.g., TPC(1), TPC(2), TPC(3), etc.) may be given by:

$$CCQE = \text{Previous\_CPICH\_Ec}/Nt + \sum_{n=1}^{Y}[1-2\cdot TPC(n)]\cdot TPC\_step\_size(n) \quad \text{Equation 1}$$

where the Previous_CPICH_Ec/Nt is the previous CQI 420 measured at subframe X, TPC_step_size(n) refers to the amount of downlink power adjustment based on the TPC(n), where the TPC(n) is the binary power control command which may have a value of "0" or "1", correlating to its actual digital representation, and a value n indicates a number of slots after the previous CQI 420 in the process of FIG. 6.

In Equation 1, the summation begins at (n=1) and continues until a value Y, where Y is a natural number indicating a given number of slots 205. In an example, Y may be min_CQI_T. In another example, Y may be larger than the min_CQI_T. In this example, Y may be equal to, for example, (min_CQI_T+k+1), where k may be a natural number in a range [0, K−1], where K is the number of slots 205 between two successive CQI reports.

In another example embodiment of the present invention, the Node B scheduler may determine whether to use the power control information in estimating the current channel quality based on at least one of a communication status of a mobile station and a channel indicator. For example, if a mobile station is engaged in a soft handoff with multiple base stations or Node Bs, the Node B scheduler may further validate the TPC command 222 because the mobile station may be leaving the coverage area of the Node B. In this example, an additional metric, such as a channel indicator, may be used to determine whether to consider the TPC command 222 for the current channel quality estimation. In an example, the channel indicator may be an uplink DPCCH channel quality. Based on an analysis of the communication status of the mobile station and the additional metrics, if a Node B scheduler decides to ignore the TPC command 222 for the estimating of the current channel quality, the previous CQI 420 without a TPC adjustment may be used as the current channel quality.

While above-described example embodiments are directed to adjusting downlink transmission power based on power control information (e.g., TPC command 222) received after the previous CQI 420, other example embodiments of the present invention may adjust any downlink transmission parameter based on the power control information. In an example, the downlink transmission parameter may be a data encoding parameter. In this example, the adjustment step (e.g., represented above in Equation 1 with respect to downlink power) may increase or decrease the level of encoding on the HS-DSCH and/or the HS-PDSCH. In a further example, the encoding may be error encoding and the adjustment step may increase or decrease a level of cyclic redundancy check (CRC) bits in downlink data transmissions.

The example embodiments of the present invention being thus described, it will be obvious that the same may be varied in many ways. For example, while example embodiments of the present invention have been described with respect to 3GPP-UMTS, it is understood that other example embodiments of the present invention may employ other UMTS protocols, CDMA2000 protocols, and/or any other well-known wireless communication protocol. It is further understood that while above-described example embodiments use power control information include at least one TPC command 222, other example embodiments of the present invention may employ other types of power control information (e.g., in other protocols) indicative of changes to downlink power.

Such variations are not to be regarded as a departure from the spirit and scope of the exemplary embodiments of the invention, and all such modifications as would be obvious to one skilled in the art are intended to be included within the scope of the invention.

We claim:

1. A method of estimating a current channel condition, comprising:
   receiving, at a network element, a first channel quality indicator; and
   generating, at the network element, a current channel quality estimate based on the first channel quality indicator and a summation of power control information, the power control information included in the summation being only power control information that is received over at least two transmission power control intervals, the at least two transmission power control intervals occurring between receipt of the first channel quality indicator and receipt of a next channel quality indicator.

2. The method of claim 1, wherein the power control information indicates whether to increase or decrease a transmission power.

3. The method of claim 2, wherein the increase or decrease to the transmission power is based on a given increment amount.

4. The method of claim 2, wherein the power control information includes at least one transmit power control bit.

5. The method of claim 4, wherein the increase or decrease to the transmission power is based on a given increment amount.

6. The method of claim 1, further comprising: adjusting a downlink transmission parameter on a downlink channel based on the generated current channel quality estimate.

7. The method of claim 6, wherein the downlink transmission parameter includes a downlink transmission power and the adjusting step increases or decreases the downlink transmission power on the downlink channel.

8. The method of claim 6, wherein the downlink transmission parameter includes a data encoding parameter and the adjustment step increases or decreases the level of encoding on the downlink channel.

9. The method of claim 6, wherein the downlink channel includes at least one of a High Speed Downlink Shared Channel and a High Speed Physical Downlink Shared Channel.

10. The method of claim 1, wherein the current channel quality indicator is received on an uplink channel.

11. The method of claim 10, wherein the uplink channel is a High Speed Dedicated Physical Control Channel in accordance with 3GPP-UMTS.

12. The method of claim 1, wherein the power control information is received on an uplink channel.

13. The method of claim 12, wherein the uplink channel is a Dedicated Physical Control Channel.

14. The method of claim 1, wherein said summation over at least two transmission power control intervals includes summation, for a given interval, in respect to a product of a given transmission power control command and a corresponding downlink power adjustment factor for the given power control command.

* * * * *